United States Patent
Caiati et al.

[15] 3,643,972
[45] Feb. 22, 1972

[54] SAFETY SHIELD

[72] Inventors: Michael I. Caiati, Evanston; William L. Lehle, Wilmette, both of Ill.

[73] Assignee: H.M.K., Inc.

[22] Filed: Jan. 26, 1968

[21] Appl. No.: 700,855

[52] U.S. Cl. ..................................280/150 B, 296/84 K
[51] Int. Cl. ..................................................B60r 21/02
[58] Field of Search............280/150 B, 150; 296/84 K, 65.1; 244/122.2; 160/392, 327; 297/216

[56] References Cited

UNITED STATES PATENTS

| 2,715,042 | 8/1955 | Lancaster | 296/84 |
| 2,839,126 | 6/1958 | O'Neill | 160/392 |
| 3,062,381 | 11/1962 | Maiden | 160/327 |
| 3,310,342 | 3/1967 | Drelichowski | 280/150 |
| 3,357,736 | 12/1967 | McCarthy | 296/65.1 |
| 2,757,040 | 7/1956 | McLelland | 296/84 |
| 3,172,702 | 3/1965 | Rose | 297/216 X |
| 3,366,977 | 2/1968 | Koehler | 160/327 X |
| 3,443,824 | 5/1969 | Dietrich | 280/150 B |

FOREIGN PATENTS OR APPLICATIONS

| 962,946 | 7/1964 | Great Britain | 280/150 B |

Primary Examiner—Benjamin Hersh
Assistant Examiner—John A. Pekar
Attorney—Hill, Sherman, Meroni, Gross & Simpson

[57] ABSTRACT

Injury to passengers in vehicles from either collision with hard surfaces and/or quick whiplash movement of the body is prevented by a safety shield comprising a yieldable, flexible transparent material removably mounted along at least two opposite edges and held taut to provide a shock-absorbing barrier between the person to be protected and the direction of movement of his person particularly in times where the movement is due to outside forces overpowering the persons ability to resist them e.g., during vehicle collisions.

8 Claims, 6 Drawing Figures

INVENTORS
Michael I. Caiati
William L. Lehle
ATTORNEYS

SAFETY SHIELD

BACKGROUND OF THE INVENTION

1. Field of the Invention

This invention relates generally to vehicle safety devices and particularly to removable transparent safety shields which may be positioned in the vehicle to prevent injury to passengers in accidents.

2. Prior Art

Passenger safety in vehicles of all kinds is rapidly becoming recognized as an important area for new and improved designs. Recent past and proposed state and federal laws requiring for example collapsible steering wheel columns, padded dashes and visors, breakaway mirrors and protusions, high back seats and seat belts of the lap and shoulder strap type indicate the directions that these developments are taking. With all these developments however there is much room for improvement. Thus while the collapsible steering wheel and column might protect the driver from flying forward on impact there is nothing similar to safeguard other front seat passengers. The padded dash is helpful, but it is the passenger's head striking the front windshield which is the high cause of injuries. Lap- and shoulder-type safety belts, even when the passenger remembers to secure them, are uncomfortable, restrict freedom of movement and may actually increase injuries by hampering the exiting of occupants from the wrecked vehicle. High back seats which extend upwardly behind the average users head to prevent the all too common whiplash injury not only restrict vision from front to rear and rear to front but also tend to create a psychological "closed in" feeling on the part of the passengers. Moreover, with the low silhouette roof line the provision of the high back seats on the rear seats tends to drastically limit the driver's rearview vision. Applicant's invention as will be hereinafter described provides what is considered to be protection equal to the above examples with none of their disadvantages.

SUMMARY OF THE INVENTION

Briefly summarized, the invention comprises a removable, flexible and yieldable transparent safety shield which is conveniently positioned in front of and behind each occupant in a vehicle. The shield material is held taut between connectors on at least two opposite edges. Basically, this positioning of the safety shield is shock absorbing to prevent the occupants from hitting forward parts of the vehicle and each other on front end collisions. On rear end collisions whiplash of all occupants is greatly reduced if not outrightly prevented by the rearward cushioning of the flexible yieldable material. At the same time each occupant has the freedom of movement which promotes relaxed, tireless travel and which may further allow quick movement of the passengers to prevent an accident. Moreover, visibility of the passenger is not at all hampered so that in an automobile for instance, the driver may have the advantage of the extra eyes in the back seat, unobstructed by a high back seat, to possibly help him spot accident causing conditions in time to avert them. Psychologically, the spaciousness of the vehicle is not impaired by the transparent material which is substantially invisible to the occupants. Division of the vehicle into somewhat separated areas also has many advantages which will become apparent in the further discussion of the invention.

Attachment of the removable shields in the vehicle may be by any suitable means for carrying our this invention that will allow convenience of installation and removability, while at the same time providing a secure connection. Thus, for example, we have found a connector comprising three parallel bars having the shield material wrapped therearound to be very satisfactory in accommodating indefinite lengths of the shield material. Where the shield material predimensioned with a loop at the edges, other means such as a single rod passing through the loop may be used. Further, if the material has straight edges they may be received in a slotted rod and the material wrapped thereby to effect connections. Different types of either of these connections may be used at either end of the shield. The material should be held along at least two opposite edges but it may be held on three or more and even completely framed.

This invention is not limited to the type of vehicle and in fact very advantageously used in air, rail, land and water craft where only one or a great number of passengers are conveyed. The possible compartmentalization of large passenger areas into what effectively is an individual "padded" or "soft surfaced" compartment or defined area is within the scope of this invention. Thus the transparent flexible and yieldable material may be only one side of the passenger or it may be on two, three or more sides to the point where the occupant is completely surrounded by this impact absorbing material. It is obvious that in the latter case the passenger will be protected from being thrown by a jolt from any side. The governing principle of placement therefore will be that the shield will be positioned wherever it may be expected to safeguard the vehicle passengers.

DESCRIPTION OF THE PREFERRED EMBODIMENTS

Figure 1:
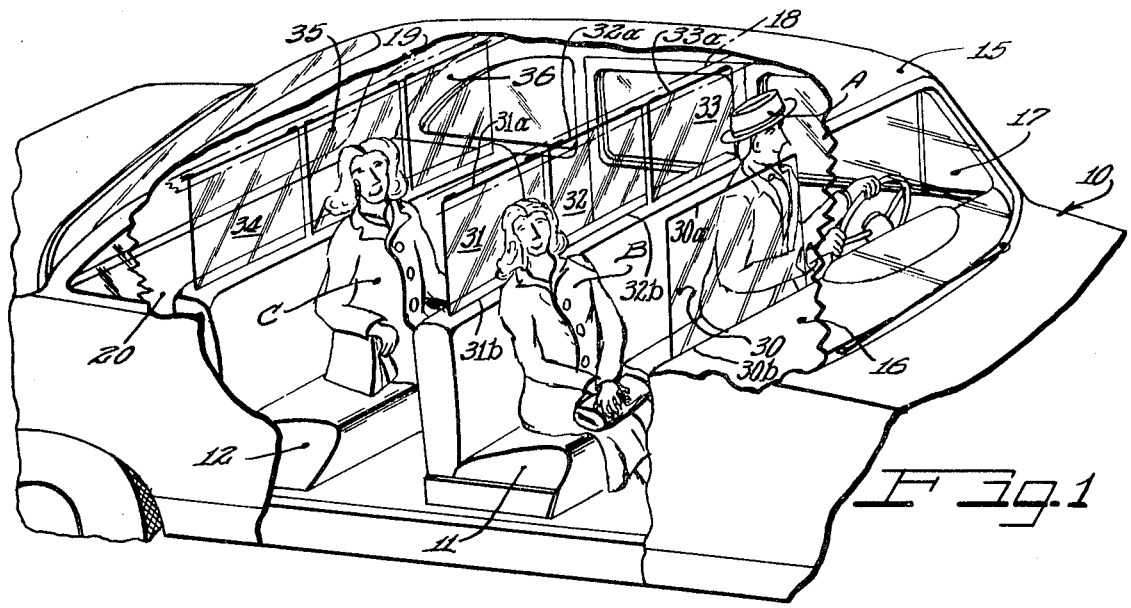
FIG. 1 shows a preferred embodiment of the invention positioned in an automobile and is seen in perspective through the vehicle body.

FIG. 1 shows an embodiment of this invention as it might be placed in a typical motor vehicle generally indicated at 10. Passengers A and B are shown seated on front seat 11 in typical riding positions. Directly in front of passenger B safety shield 30 extends from an upper edgewise connection 30a on the interior of roof 15 to a lower connection 30b on the dashboard 16. In this position shield 30 will be held taut between the upper and lower connections to absorb the momentum of the upper portion of the body of passenger B during a front end impact of the vehicle 10 and prevent B from striking the hard surface windshield 17 and C from striking A or B.

Safety shields 31, 32 and 33 are located behind passengers A and B and as shown extend from upper connections 31a, 32a, 33a respectively on the interior of roof 15 to lower connections 31b, 32b and 33b on front seat 11. It may be seen from the relationship of the upper portions of the bodies of passengers A and B, particularly their heads, to the safety shields 31, 32 and 33 that in the event of the application of a force from the rear, the rearward movement of A's and B's head will be restricted so that what is termed a "whiplash" injury will be prevented. As shown, both safety shields 30 and 32 will accommodate an additional passenger seated front and center. The particular positioning of the safety shields of course will depend on the size and type of vehicle.

Passenger C shown centrally positioned on rear seat 12 is protected from being thrown forward by safety shields 31, 32 and 33. Likewise rearward motion of the head, neck, and upper torso is prevented by safety shields 34, 35 and 36 extending from connections on the interior roof 15 to connections on seat 12. It may be thus seen how the safety shields function to protect the vehicle passenger by insulating the passengers from contact with hard objects and from each other during periods when the forces acting upon the passenger overpowers their free will and ability to resist.

Although any flexible, yieldable transparent material suitable for absorbing the impact of the passengers and articles may be used, we have found that Du Pont "Mylar" of a type "S" or "D" in thicknesses of 3-10 mills has proven satisfactory in being substantially invisible and of high tensile strength over a temperature range of from −65° to +300° F. Its excellent properties, too numerous to mention here, ready availability from the manufacturer, low cost and adaptability make this product particularly suited to our invention. It is to be understood however, that other products possessing the properties herein set out may also be used in practicing our invention.

Figure 2:
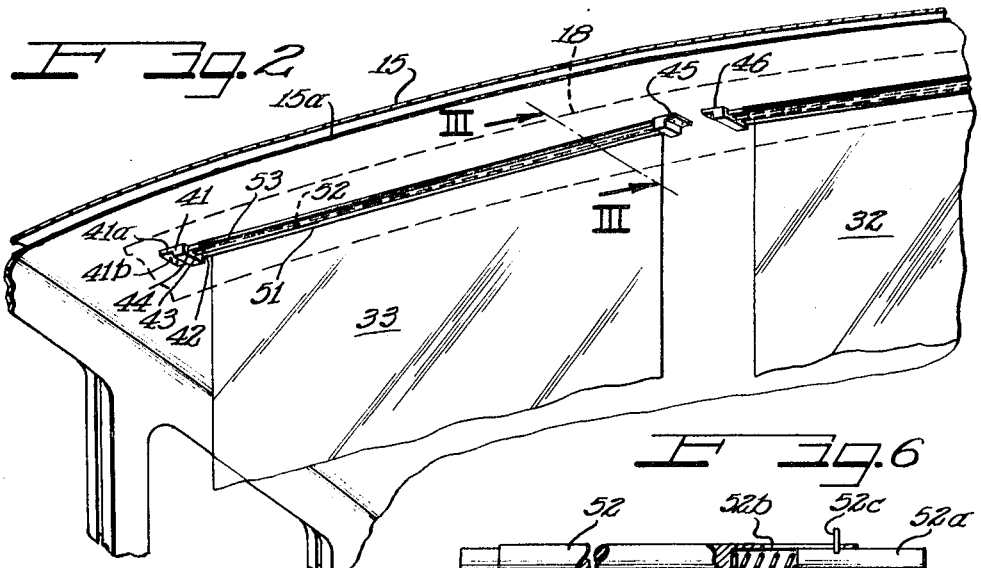
FIG. 2 shows the invention as it might be seen by a rear seat passenger looking up in FIG. 1.
Figure 6:
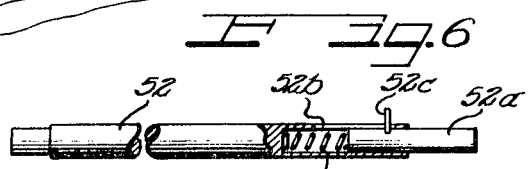
FIG. 6 shows a spring biased connector element.
Figures 3, 4, 5:
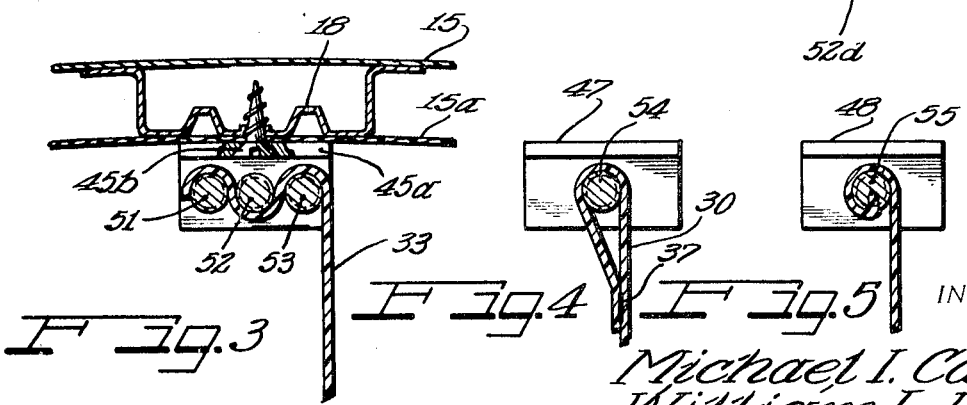
FIG. 3 shows a cross section taken along line III—III in FIG. 2.
FIG. 4 shows another embodiment of the connector means as seen in a view similar to FIG. 3.
FIG. 5 shows yet another embodiment of the connector means also as would be seen in a view similar to FIG. 3.

In FIGS. 2 and 3, we have shown one means of connecting the safety shield material to its supports. Although the connection shown is to a typical vehicle roof interior, this joint may also be used for attachment of the safety shield material to the seats, dashboard or other lower supports. Basically, the connector of FIGS. 2 and 3 comprises spaced brackets 41 and 45 supporting rods 51, 52 and 53 at their ends. Thus rod 51 has one end in hole 42 of bracket 41 and its opposite end in a similar hole of bracket 45. Likewise, rod 53 has one end in hole 44 and its other end in a similar hold in bracket 45. Rods 51 and 53 may be of a fixed length and ordinarily will be placed in position when the brackets 41, 45 are initially mounted. By contrast, rod 52 as is shown in FIG. 6 may have an extensible portion 52a mounted on its hollow end. This hollow end has an axially extending slot 52b therein with an outwardly projecting protrusion 52c of extension 52a projecting therethrough so that extension 52a may be moved inwardly against the bias of spring 52d for removal of the rod 52 from the holes in brackets 41 and 45. It may thus be seen that the safety shield material 33 may be positioned and placed as shown in FIG. 3 by sliding it over rods 53, 51, looping it therebetween, extending rod 52 into this loop and engaging the ends of rod 52 into hole 43 on bracket 41 and a corresponding hold in bracket 45. With the rods 51, 52 and 53 properly spaced from each other a secure joint is formed for the safety shield material. It is to be understood that connectors of this type may be used to mount shields 30-36 at both their upper and lower edges. Brackets 41 and 45 may be mounted by any suitable means, however, we have found that by providing a flange portion 41a and 45a having suitable fasteners 41b and 45b extending through the interior covering 15a into the vehicle body ribbing 18, 19 to be a quick and convenient means of attachment. One or more flanges may be provided for each bracket and they may be any configuration, in any alignment, and with provision for any number of fasteners suitable for carrying out our invention in any type or size of vehicle. As shown in FIG. 2, the adjacent bracket 46 or the adjacent safety shield 32 may be spaced from the bracket 45 to provide a space between shield 32 and 33. It is emphasized however, that in lieu of shields 31, 32 and 33 a single shield or any number of individual shields may be provided. Similar comments apply to shields 34, 35 and 36 and shield 30. Moreover the shields may be abutting, over lapped, or spaced and parallel. It is the object of our invention to place safety shields in such a relation to vehicle passengers so as to prevent their injury from outside forces acting against their bodies, and therefore the particular placement arrangement, alignment or means used to place them in position to practice our invention are contemplated within the scope of this invention. Thus, for example, in the motor vehicle as illustrated in FIG. 1 the upper edge of shield 30 for instance could have a looped portion through which a rod 54 similar to those used in mounting interior sun visors could be mounted so that the connection might appear as shown for example in FIG. 4. The ends of rod 54 would be suitably mounted in brackets 47. The joint 37 as shown in FIG. 4 must be at least as strong as the material and is preferably of an ultrasonic seal, adhesive joint, stapled joint, or high quality sewn joint. FIG. 5 illustrates yet another possible safety shield connection to its support. Here the rod 55 is slotted and a free edge of the shield is inserted in the slot and wrapped around the rod until a secure connection is obtained. Rod 55 may be mounted at each end in brackets such as 48 which prevent the rod from rotating about its axis.

At its lower end safety shield 30 may be mounted above the glove compartment door usually found in motor vehicles of this type. The lower connection may possibly be recessed or otherwise treated to carry out the overall safety concept of this invention. Similarly shields 31-36 may be mounted at their upper and lower edges through any means, especially those of FIGS. 2-5. It must be noted however, that the attachment of the lower shields 31, 32 and 33 for example may also be to the floor of the vehicle or to a lower portion of the seat with the material extending down to the floor in front or back of the front seat.

Thus seats 11 and 12 usually face in the same direction and have front and rear edge portions. Shield 30 will normally be positioned forward of the front edge portion of seat 11 and shields 31, 32, 33 or their equivalents will usually be positioned forward of rear seat 12. The exact distances, inclinations, material quantity and quality are matters of design depending on the size, type and expected safety conditions of the vehicle. In these positions the shields must be able to protect the passenger normally seated in the vehicle from being propelled forwardly against his resistance into a hard surface or object in the vehicle. In the case of shields 31-33 and 34-36 or their equivalents their purpose is to prevent large movements of the upper torso due to sudden impact forces from the rear. These shields therefore will be positioned much closer to the rear of the passengers heads. The exact positioning, inclination etc., again are matters of design which will vary in consideration of vehicle size, type, individual preferences and safety considerations. It is not necessary that the safety shields be made entirely of one material. For example, the lower portion of shields 31 to 36 may be made of a fabric, padded or other material for increased comfort to the passenger. Also the lower portion may be straps or webbing. If the shield extends down in front of the seat i.e., directly behind the passenger body, it may be vented or spaced from the seat to allow circulation of air behind the passenger's back. If the safety shields 31, 32 and 33 for example extend behind the seat i.e., of a portion of seat 11 remote from the bodies of passengers A and B, it may have suitable convenience features attached thereto such as litter pockets, soft tissues receptacles and other items which are not contradictory to the safety concept of this invention.

In other respects the shields may be modified or adapted to suit the particular environment and accommodations in which it is placed. Thus it may be decorated, have its edges such as its outside edges of shields 31 and 33 reinforced against wear, wind, etc., indicia may be placed thereon to guide the user in his operation of the vehicle or for advertising and display purposes. Holes may be placed to allow air circulation or the material may be meshlike. If the shields are mounted in frames it is contemplated by this invention that they may be mounted in channels along two opposite edges that allow them to be recessed into the back of the seats with the seats securely locked and mounted against movement on the vehicle body. This is particularly adaptable to seats which rotate.

Here it may be noted that the shields 34, 35 and 36 prevent objects on the rear ledge 20 from flying forward to cause injury. It is paramount however, that these shields be placed and installed so they are taut flexible and of sufficient tensile strength to absorb the impact of the passenger's body or other articles to prevent injury thereto.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim as our invention:

1. A vehicle safety device for preventing the injury of a passenger due either to collision with a hard object on or in the vehicle and/or quick whiplash movement comprising: a vehicle, a defined area in said vehicle adapted to be occupied by persons or objects, a potential injury producing means adjacent said area, a first flexible, yieldable transparent shield means mounted between said area and said injury producing means thereby serving as a shock absorbing barrier to prevent injury to said persons or objects if said persons or objects should be projected by an external force toward said injury producing means, said defined area containing at least two spaced first and second seats each facing in a first direction, each of said seats having a front and rear edge portion, said first shield means being positioned adjacent said front edge portion of said first seat, a second shield means being positioned near said rear edge portion of said first seat and adjacent said front edge portion of said second seat, a third shield means being positioned near said rear edge portion of said second seat, said second and third shield means thereby preventing whiplash producing movement of persons seated in said first and second seats.

2. The vehicle safety device according to claim 1 wherein said second and third shield means comprises: a plurality of separated flexible, yieldable, transparent elements.

3. The vehicle safety device according to claim 1 wherein said first, second and third shield means have respective upper and lower edges, said first, second and third shield means are held taut by connections along their respective upper and lower edges, said connections being to the vehicle.

4. The vehicle safety device according to claim 1 wherein said safety device shields are made of flexible, yieldable transparent material.

5. The vehicle safety device according to claim 1 wherein mounting means are provided on at least two opposite edges of at least one of said shields whereby they are held in taut shock absorbing position.

6. The vehicle safety device according to claim 5 wherein at least one of said mounting means comprises: a pair of spaced brackets connected to said vehicle, first and third rods having their opposite ends mounted in said brackets, a removable second rod positioned between said first and third rods, said shield having a portion weaving around and between said first, second and third rods to provide a secure connection.

7. The vehicle safety device according to claim 5 wherein at least one of said mounting means comprises: a pair of spaced brackets connected to said vehicle, a single rod extending between said brackets, said shield having a looped portion along said edge adjacent said mounting means and said rod passing through said looped portion to form a secure connection.

8. The vehicle safety device according to claim 5 wherein at least one of said mounting means comprises: a pair of spaced brackets connected to said vehicle, a slotted rod extending between said brackets and mounted against rotary movement, said shield having a free edge extending into said slot so that said shield is securely mounted to absorb impact.

* * * * *